UNITED STATES PATENT OFFICE 2,321,310

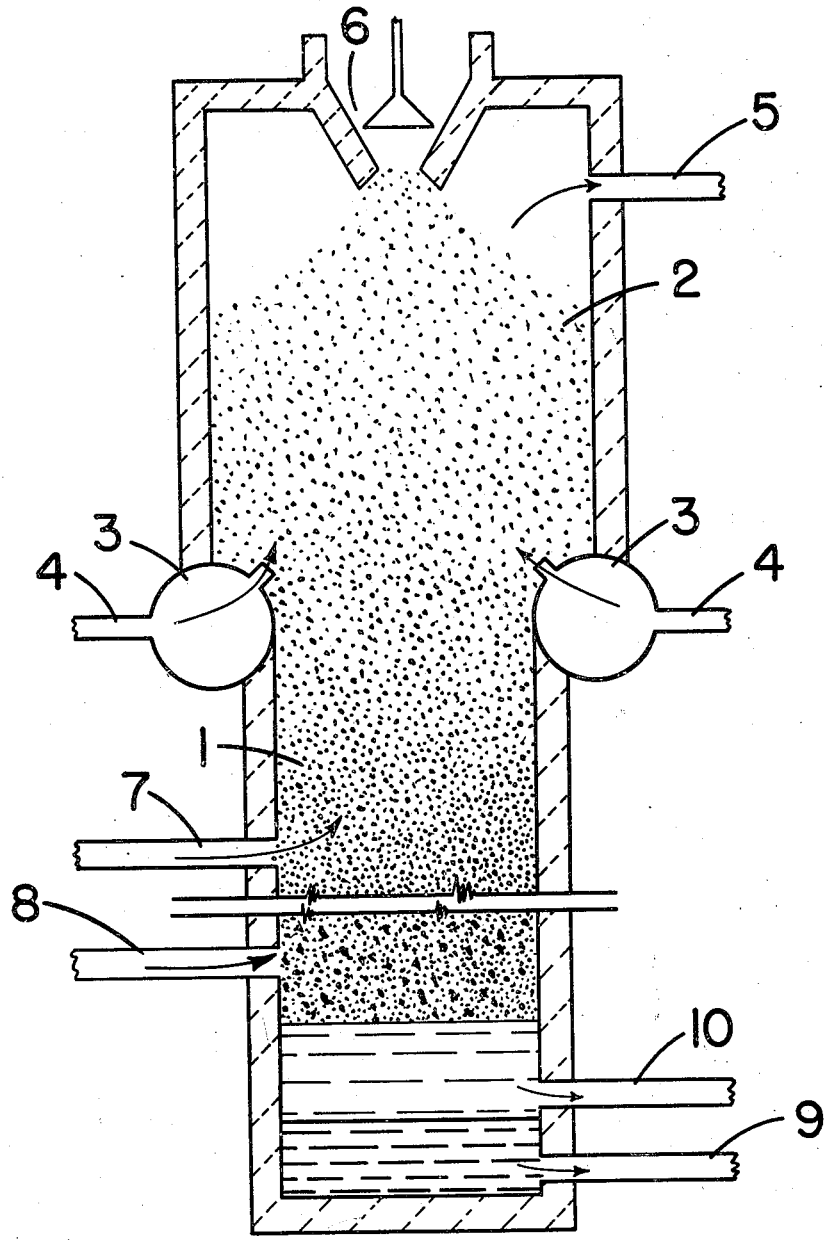

SMELTING IRON ORE

Thomas V. Moore, Houston, Tex., assignor to Standard Oil Development Company, a corporation of Delaware Application February 14, 1941, Serial No. 378,870

2 Claims. (Cl. 75—26)

The present invention is directed to a method for recovering iron from iron ore and particularly to a method which permits the utilization of gas, both as fuel and as a reducing agent. In a co-pending application, Serial No. 313,371, filed January 11, 1940, which matured into Patent No. 2,292,579, dated August 11, 1942, and entitled Reduction of iron ores, there has been described a method for utilizing gas in the recovery of iron from iron ore according to which the reduction step in the recovery process is carried out at a temperature above the melting point of pure iron, in order to avoid the plastic stage through which iron passes in going from a solid to a liquid. The method described in said co-pending application involves the use of a rotary kiln.

According to the present invention, gases are used for the recovery of iron from iron ore in a continuous method carried out preferably in a vertical stationary tower. The method involves a plurality of stages which, in order, are the preheating stage, the reduction stage, and the carburizing stage. The reduction stage is carried out at a temperature below the melting point of pure iron but above the melting point of iron-carbon alloy, which is formed in the carburizing stage.

Briefly, the method of the present invention comprises passing powdered iron oxide, with which slag-forming constituents such as lime, clay, magnesia, and the like may be mixed if desired or necessary, downwardly through a tower in the upper zone of which the mixture passes in countercurrent to a hot oxidizing gas which preheats it to the reduction temperature. Next, the mixture passes countercurrent to a stream of hydrogen carrying sufficient air to burn enough of the hydrogen to maintain the temperature desired but, of course, insufficient air to render the gas an oxidizing gas as distinguished from a reducing gas. Next, the mixture passes countercurrent to a carburizing gas, that is, a hydrocarbon gas which, at the temperature of operation will decompose to supply hydrogen and thermatomic carbon so that the latter may combine with the reduced iron to form a low melting alloy of iron and carbon.

The nature of the present invention will be more clearly understood from the following detailed description of the accompanying drawing, the single figure of which is a schematic view in section of an apparatus suitable for the practice of the present invention. Referring to the drawing in detail, numeral 1 designates a tower, the upper portion 2 of which is of somewhat enlarged diameter. Arranged around the bottom of portion 2 is a manifold 3 to which gas is fed by tubes 4. At the upper end of portion 2 of the tower is an outlet 5 for gas and an inlet 6 for powdered iron oxide and slag-forming materials. At this point it should be noted that the apparatus will be provided with suitable equipment, such as cone hoppers or the like, for the introduction of the iron ore and the slag-forming constituents and the distribution thereof across the section of the tower but these details are omitted here since they form no part of the present invention. It will also be understood that the manifold 3 will be of one of the approved constructions for such devices commonly used in the blast furnace art but is shown here only diagrammatically for the sake of clarity.

At a suitably selected point below portion 2 of the tower is arranged an inlet 7 for hydrogen and air. Here it should be noted that the hydrogen is introduced through a ring manifold or tuyère or through some other equivalent appliance an internal ring-shaped nozzle such commonly known in the art for distributing the gas throughout the falling mass of material. The hydrogen itself is preferably prepared from natural gas by pyrolysis of the latter. Alternatively, the natural gas may be reacted with steam in the presence of a suitable catalyst and at a temperature so selected that the products of the reaction are hydrogen and carbon monoxide, both of which are effective in the reduction of iron oxide to metallic iron.

The hydrogen or ore-reducing gas will be suitably preheated to a temperature somewhat above 1300° C. Sufficient air is introduced with the hydrogen to maintain the temperature in the reduction zone at a value between about 1100–1400°, preferably in the neighborhood of 1300° C.

At a point suitably spaced from the point of introduction of the reducing gas, and below it, is arranged another inlet 8 for carburizing gas. Here, again, the gas will be introduced through a suitable device for distributing it throughout the mass. At this point a hydrocarbon gas may be employed, natural gas being preferred. This gas is also preheated to a temperature somewhat above that maintained in the reduction zone and is accompanied by a quantity of air sufficient to maintain the desired temperature, which will be substantially the same as the temperature maintained in the reduction zone and in any case above about 1,000° C. When methane or other hydrocarbon gas is used at this point, it is cracked to hydrogen and thermatomic carbon. The former passes upwardly and assists in the reduction stage. The latter is deposited in the falling mass and combines with the iron in this mass to produce the low-melting iron-carbon alloy, commonly known as pigiron, which settles to the bottom and may be drawn off through an outlet 9. The second outlet 10 is arranged at a higher point for withdrawing slag.

Instead of introducing a hydrocarbon gas at point 8 there may be introduced a suspension of finely divided carbon such as thermatomic carbon, which may be obtained from the pyrolysis of hydrocarbon gas used for the production of the hydrogen introduced at point 7. This carbon may be suspended in a non-oxidizing gas containing sufficient air to provide, by combustion with a portion of the carbon, sufficient heat to maintain the desired temperature.

As has been previously indicated the iron ore is used in powdered form. It is introduced at such a rate with respect to the velocity of the various gas streams that it is partly supported by the upflowing gas whereby it moves downwardly through the vessel slowly. When the iron ore is sufficiently pure the addition of slag-forming constituents may be omitted. Where the iron ore contains considerable high melting impurities which must be removed, however, it is desirable to add slag forming material to the charge. In order to avoid any possibility of the slag interfering with the reduction and carburizing stages it is preferred, according to the present invention, to add the slag forming material in the form of lumps which are quite large relative to the iron ore so that these lumps will have no tendency to produce a coating of slag on the particles of iron ore and will descend through the vessel at a much more rapid rate than the iron ore. Since it is only near the bottom of the vessel that the slag-forming constituents actually perform their function, it is unnecessary to provide for any intimate mixture of these constituents with the iron ore in the higher levels of the vessel. In practice this slag can be added in lumps ranging in size from about pea size to relatively large lumps, as large as egg size.

In operating according to the present invention it is important to select a vessel of suitable diameter to enable the partial suspension of the iron ore by the gas without using an excessively high velocity and therefore a prohibitively large quantity of the gas. The vessel to be used should be designed with various factors in mind such as the particle size of the iron ore to be used, the heat input into these particles from the gas, the amount of gas which can economically be used, the velocity of the gas required to regulate the falling rate of the particles, etc. The vessel will, of course, be supplied with suitable insulation and with heat exchangers at appropriate points for economical operation.

The nature and objects of the present invention having been thus described and illustrated, what is claimed as new and useful and is desired to be secured by Letters Patent is:

1. A method for recovering iron from iron ore which comprises dropping iron ore, in a finely divided state, together with slag forming material in discrete form heavier than the ore particles through a rising stream of gas which is of a different composition at different levels, being of an oxidizing nature at the uppermost level and a reducing nature at a lower level, and adjusting the velocity of the gas so as to cause the ore to drop at a retarded rate so regulated as to maintain the particles in each zone for the desired period.

2. A method for recovering iron from iron ore which comprises dropping iron ore, in a finely divided state, together with slag forming material in discrete form heavier than the ore particles through a rising stream of gas which is of a different composition at different levels, being of an oxidizing nature at the uppermost level, a reducing nature at the next lower level, and a carburizing nature at the next lower level, and adjusting the velocity of the gas so as to cause the iron ore to drop at a retarded rate so regulated as to maintain the particles in each zone for the desired period.

THOMAS V. MOORE.